(12) United States Patent
Nemoto et al.

(10) Patent No.: US 9,955,027 B2
(45) Date of Patent: Apr. 24, 2018

(54) AFFILIATED SERVICE PROVISION METHOD

(71) Applicant: HITACHI, LTD., Tokyo (JP)

(72) Inventors: Naokazu Nemoto, Tokyo (JP); Yoshiki Matsuura, Tokyo (JP); Yukiko Takeda, Tokyo (JP); Hideya Yoshiuchi, Tokyo (JP); Tatsuhiko Miyata, Tokyo (JP); Tsuneo Sobue, Tokyo (JP)

(73) Assignee: HITACHI, LTD., Tokyo (JP)

( * ) Notice: Subject to any disclaimer, the term of this patent is extended or adjusted under 35 U.S.C. 154(b) by 15 days.

(21) Appl. No.: 15/096,341

(22) Filed: Apr. 12, 2016

(65) Prior Publication Data

US 2016/0309044 A1    Oct. 20, 2016

(30) Foreign Application Priority Data

Apr. 17, 2015    (JP) ................................ 2015-084672

(51) Int. Cl.
*H04M 15/00*        (2006.01)
*H04L 12/14*        (2006.01)
(Continued)

(52) U.S. Cl.
CPC .... *H04M 15/8228* (2013.01); *H04L 12/1435* (2013.01); *H04L 41/5025* (2013.01); *H04L 41/5029* (2013.01); *H04L 41/5054* (2013.01); *H04M 15/06* (2013.01); *H04M 15/48* (2013.01); *H04M 15/68* (2013.01); *H04M 15/885* (2013.01)

(58) Field of Classification Search
CPC .. H04M 15/8228; H04M 15/06; H04M 15/48; H04M 15/68; H04M 15/885; H04L 41/5025; H04L 12/1435; H04L 41/5029; H04L 41/5054
See application file for complete search history.

(56) References Cited

U.S. PATENT DOCUMENTS 7,222,165 B1 * 5/2007 Ellis .................... G06Q 20/102
                                                      370/395.1
2004/0033797 A1    2/2004  Raivisto et al.
(Continued)

OTHER PUBLICATIONS

<http://www.amazon.com/gp/help/customer/display.html?nodeID=200506200 2014/12/24access>, "Kindle Terms of Use"; last updated Sep. 17, 2014.

*Primary Examiner* — Marcos Torres
(74) *Attorney, Agent, or Firm* — Volpe and Koenig, P.C.

(57) ABSTRACT

When a plurality of services are enjoyed by a single terminal, a communication regulation caused by another service has influence on enjoyment of another service. A service provider and a mobile communication provider are affiliated with each other and newly provide an affiliated service in which a communication fee for a service use is borne by the service provider to a user. Conventional communication and affiliated service communication are performed on a single communication line of the user together, and communication control is performed in units of services such that a service quality of the affiliated service is maintained. It is implemented by affiliating a communication log and contract information between business operators and performing communication identification using user information at the time of a contract as a key.

20 Claims, 14 Drawing Sheets

(51) Int. Cl.
*H04L 12/24* (2006.01)
*H04M 15/06* (2006.01)

(56) References Cited

U.S. PATENT DOCUMENTS

| | | | |
|---|---|---|---|
| 2005/0220039 A1* | 10/2005 | Hoshino | H04L 29/06027 370/261 |
| 2013/0174186 A1* | 7/2013 | Kelsen | H04N 21/2543 725/2 |
| 2013/0246528 A1* | 9/2013 | Ogura | H04L 67/2814 709/204 |
| 2013/0304616 A1* | 11/2013 | Raleigh | G06Q 20/145 705/34 |

* cited by examiner

F I G. 7
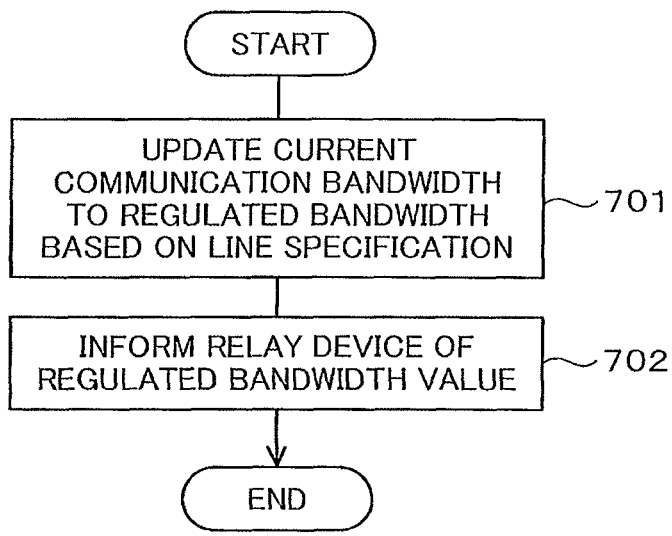
F I G. 8
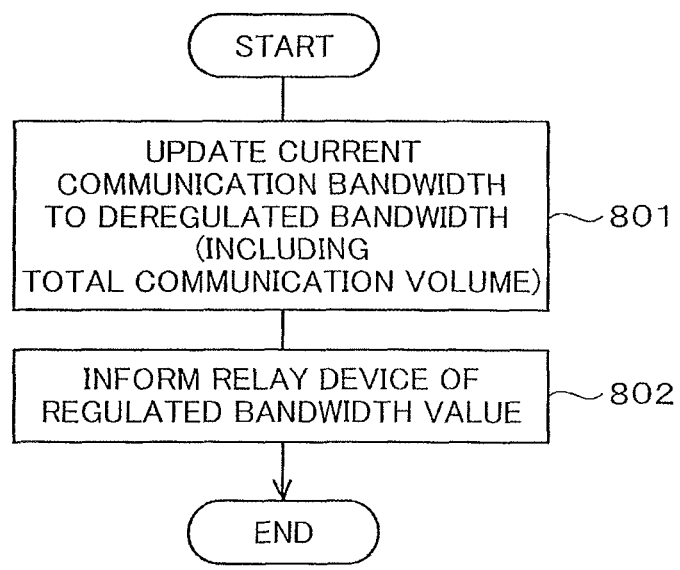

FIG. 11

```
SERVICE:  [CAR NAVIGATION]   SERVICE ID: [Premium_01]
SERVER IP: [20.0.0.1] [20.0.0.2]  [ADD]
LINE SPECIFICATION:

LINE TYPE   BAND      COMMUNICATION   REGULATED
                      VOLUME          BAND
[LTE ▼]    [75Mbps ▼] [20GB ▼]       [128kbps ▼]

[ SET ]    [ CANCEL ]
```

FIG. 12

LICENSE CONTRACT
THIS DOCUMENT INCLUDES PROTECTION INFORMATION AND LICENSE CONTRACT APPLIED TO CAR NAVIGATION SOFTWARE USE.
...
COMMUNICATION FEE FOR USE OF CAR NAVIGATION SOFTWARE IS BORNE BY SERVICE PROVIDER. COMMUNICATION TYPE, BAND, AND LIKE ARE SET TO SETTING VALUES DECIDED BY CAR NAVIGATION SOFTWARE
...

[ AGREE ]    [ DISAGREE ]

FIG. 13

```
SERVICE : CAR NAVIGATION
SERVICE TYPE : [Premium_01 ▼]
FEE : 2000
LINE SPECIFICATION :

LINE TYPE    BAND      COMMUNICATION   REGULATED
                       VOLUME          BAND
LTE          75Mbps    20GB            128kbps

REGISTERED
TELEPHONE NUMBER : [09012345678]

[ APPLY ]   [ CANCEL ]
```

```
SERVICE : [CAR NAVIGATION]   SERVICE ID: [Premium_01]
USER ID : [09012345678]
          [08087654321]  [ADD]

[ SET ]    [ CANCEL ]
```

1400

| SERVICE: | CAR NAVIGATION | SERVICE ID: | Premium_01 |

USER ID: 09012345678

LINE SPECIFICATION:

| LINE TYPE | BAND | COMMUNICATION VOLUME | REGULATED BAND |
|---|---|---|---|
| LTE ▼ | 75Mbps ▼ | 20GB ▼ | 128kbps ▼ |

SET     CANCEL

F I G. 1 7

| SERVICE PROVIDER ID | SERVICE ID | REGISTERED USER LIST |
|---|---|---|
| CAR NAVIGATION A | premium_01 | P_list1 |
| CAR NAVIGATION A | normal_01 | N_list1 |
| MOVING IMAGE D | movie_big_01 | MB_list1 |

1700  1701  1702  1703

F I G. 1 8

| SERVICE PROVIDER ID | SERVICE ID | SERVER IP |
|---|---|---|
| CAR NAVIGATION A | premium_01 | 20.0.0.1 |
| CAR NAVIGATION A | premium_01 | 20.0.0.2 |

1800  1801  1802  1803

F I G. 1 9

1900

| LINE SPECIFICATION ID | SERVICE ID | LINE TYPE | COMMUNICATION BANDWIDTH | COMMUNICATION VOLUME (RESTRICTION VALUE) | FEE PLAN ID | RESTRICTED BANDWIDTH |
|---|---|---|---|---|---|---|
| spec_001 | premium_01 | LTE | 75Mbps | 20GB | plan_001 | 512kbps |
| spec_002 | normal_01 | LTE | 75Mbps | 10GB | plan_002 | 128kbps |

1901  1902  1903  1904  1905  1906  1907

F I G. 2 0

| SERVICE ID | REGISTERED USER LIST | USER ID |
|---|---|---|
| premium_01 | P_list1 | 09012345678 |
| normal_01 | P_list1 | 08087654321 |

2000  2001  2002  2003

F I G. 2 1

2100

| SESSION ID | USER ID | TERMINAL IP | DESTINATION IP | COMMUNICATION VOLUME | COMMUNICATION TIME |
|---|---|---|---|---|---|
| SES_0001 | 09012345678 | 10.10.10.100 | 20.0.0.1 | 123000 | 2014/05/05 12:59:00 |
| SES_0002 | 08087654321 | 10.10.10.200 | 20.0.0.1 | 567000 | 2014/05/05 13:10:00 |

2101  2102  2103  2104  2105  2106

F I G. 2 2

| FEE PLAN NAME | FEE PLAN ID |
|---|---|
| PACKAGE | plan_001 |
| FIXED | plan_002 |
| LINE CONTRACT METERED RATE | Phone_metered |

2200  2201  2202

F I G. 2 3

| FEE PLAN NAME | CALCULATION METHOD |
|---|---|
| PACKAGE | XXXX YEN PER EVERY 100 USERS |
| FIXED | ZZZZ YEN PER USER |
| LINE CONTRACT METERED RATE | YYYY YEN PER PACKET |

2300  2301  2302

F I G. 2 4

2400

| SERVICE ID | USER ID | FEE PLAN ID | COMMUNICATION BANDWIDTH | TOTAL COMMUNICATION VOLUME |
|---|---|---|---|---|
| premium_01 | 09012345678 | plan_001 | 75Mbps | 123000000 |
| premium_01 | 08087654321 | plan_001 | 75Mbps | 567000000 |

2401  2402  2403  2404  2405

F I G. 2 5

2500

| SERVICE PROVIDER ID | SERVICE PROVIDER NAME | BILLING DESTINATION INFORMATION |
|---|---|---|
| CAR NAVIGATION A | A CAR NAVIGATION COMPANY | BILL_A1 |
| MOVING IMAGE D | D MOVING IMAGE COMPANY | BILL_D1 |

2501　2502　2503

F I G. 2 6

1900

| LINE SPECIFICATION ID | SERVICE ID | LINE TYPE | COMMUNICATION BANDWIDTH | COMMUNICATION VOLUME (RESTRICTION VALUE) | FEE PLAN ID | RESTRICTED BANDWIDTH | SHARABLE VOLUME |
|---|---|---|---|---|---|---|---|
| spec_001 | premium_01 | LTE | 75Mbps | 20GB | plan_001 | 512kbps | 500MB |
| spec_002 | normal_01 | LTE | 75Mbps | 10GB | plan_002 | 128kbps | 0 |

1901　1902　1903　1904　1905　1906　1907　1907

F I G. 2 7

2400

| SERVICE ID | USER ID | FEE PLAN ID | COMMUNICATION BANDWIDTH | TOTAL COMMUNICATION VOLUME | SHARABLE VOLUME |
|---|---|---|---|---|---|
| premium_01 | 09012345678 | plan_001 | 75Mbps | 123000000 | 500MB |
| premium_01 | 08087654321 | plan_001 | 75Mbps | 567000000 | 0 |

2401　2402　2403　2404　2405　2406

AFFILIATED SERVICE PROVISION METHOD

INCORPORATION BY REFERENCE

This application claims priority based on Japanese patent application, No. 2015-084672 filed on Apr. 17, 2015, the entire contents of which are incorporated herein by reference.

BACKGROUND

The present disclosure relates to a technique of deciding a fee calculation and a fee payer of a communication fee in a network system.

In recent years, traffic has abruptly increased with the spread of large-capacity content. Communication providers that operate network systems are currently forced to make a significant investment for countermeasures. In addition, an audio average revenue per user (ARPU) decreases, and there is a concern that corporate profits of communication providers would decrease. Against this background, many communication providers have changed a billing system from a typical flat rate system to a metered rate system. The metered rate system is a system that billing is made in a step-by-step manner. A communication control device operated by a communication provider narrows a communication band (performs a communication regulation) and suppresses a communication rate for a user device (also referred to as a "terminal") when a communication data amount for the user device exceeds a predetermined amount. In order to recover the communication rate, the user has to accept new billing.

Currently, service providers provide various services using a network system. Examples of the service include a world wide web (WWW), an e-mail system, a moving image provision service, and a car navigation system including a high-resolution image or video.

In recent years, with the spread of high-performance mobile terminals represented by smartphones, an environment in which various services can be used by one terminal has been created. A target for which a predetermined communication data amount serving as a threshold value for a communication regulation is counted includes all communications of various services.

For example, in car navigation systems, text data or many images are commonly regarded as main components. In the car navigation system that receives many images using the network system, since large-capacity data is used compared to WWW or the e-mail system, a large amount of communication is likely to occur, and there is a feature in which a screen or a video needs to be delivered according to driving of a vehicle. When the user enjoys a service such as a moving image provision service or a car navigation system through its own device, it may be a target for the communication regulation due to a prolonged use or the like.

A target for which a predetermined communication data amount is counted includes a plurality of services provided to the same user device in addition to the service of the car navigation system. As an example of a special service of the car navigation system, there is also a form in which rich content associated with audio guidance is provided at a high resolution. When a predetermined communication data amount is exceeded due to the use of such a form of the service by the user device, a service quality of a necessary service, for example, a service quality of the car navigation system is not secured due to the communication regulation, and a delivery delay of an image or a video or the like occurs.

In other words, the user device is subject to the communication regulation due to communication of a service other than the car navigation system, and thus it is hard to enjoy the original service quality of the necessary service.

CITATION LIST

Patent Document

Patent Document 1: US Patent Publication No. 2004/0033797

Non-Patent Document

Non-Patent Document 1: Kindle Terms of Use <http://www.amazon.com/gp/help/customer/display.html?nodeId=2005 06200 2014/12/24access>

SUMMARY

Non-Patent Document 1 discloses a service provision method capable of using a dedicated terminal only for a specific service. By limiting it to a dedicated service, it is possible to remove influence on other services, and it is possible to maintain a service quality only for a car navigation system, for example. However, since a terminal needs to be prepared for each service, there is a problem in which a burden on the user increases.

In the present disclosure, in order to solve the above problems, a first system of identifying communication for a certain user device in units of services is provided.

Specifically, through the first system, a communication control device operated by a communication provider identifies communication for the user device in units of contracted services (referred to as "affiliated services") using information of a contract made between the communication provider and the service provider in advance. Further, other services that are not contracted in advance can be collectively identified as a non-affiliated service.

Patent Document 1 discloses a technique of identifying communication based on an IP address or a domain (Paragraph 0028). However, when the technique disclosed in Patent Document 1 is used, if a plurality of services are provided through the same server (the same IP address or the same domain) providing the service, it is hard to identify each service (communication). Further, although it is possible to identify communication, a communication regulation is performed due to influence of communication of the other services as described above, and, for example, countermeasures for maintaining the service quality of the car navigation system is not described, and the problem is not solved.

According to the first system of the present disclosure, even when a plurality of services are provided from the same server (for example, the same IP address or the same domain), the communication for the user device can be identified for each service, regardless of a service provision source device.

Based on the identification result, a communication provider device can implement a second system of performing independent communication regulations on two or more of a plurality of affiliated services and services (non-affiliated services) other than the affiliated service which are provided to a single communication terminal in units of services.

Through the second system, it is possible to prevent a plurality of services from being influenced by the communication regulation caused by the other services. A system capable of controlling service provision without influencing the other services can be implemented.

Further, based on the identification result, the communication control device can implement a third system of separately calculating a communication fee for each affiliated service and a communication fee for a service (referred to as a "non-affiliated service") other than the affiliated service.

Through the third system, the communication provider can bill the user or the service provider serving as a communication fee payer in units of services.

In addition, a fourth system in which the user pays a use fee of each service based on a prior contract with the service provider, and the service provider pays a communication fee of each service to the communication provider is provided. The use fee of each service paid by the user is preferably decided based on the communication fee calculated for each service.

According to one aspect of the present disclosure, a network system that relays communication for implementing a plurality of services performed by a terminal and one or more service providing devices that provide the services to the terminal is provided.

The network system includes a relay device and a communication control device, the communication control device manages a session log received from the relay device and service management information related to the communication for implementing the service to be relayed, a user identifier of a user using the terminal and an address of the service providing device that provides the service to the terminal are associated as the session log, a service identifier of the service provided by the service provider, the address of the service providing device that provides the service, an identifier of a registered user list indicating a user that makes a contract in which the services are provided as affiliated services, and the user identifier are associated as the service management information, and the communication control device specifies the service provided to the terminal used by the user indicated by the user identifier as any one of the affiliated services or a non-affiliated service based on the user identifier and the address of the service providing device described in the session log.

According to the disclosure, it is possible to identify communication for each service, and an application can be made based on it.

The details of one or more implementations of the subject matter described in the specification are set forth in the accompanying drawings and the description below. Other features, aspects, and advantages of the subject matter will become apparent from the description, the drawings, and the claims.

BRIEF DESCRIPTION OF THE DRAWINGS

FIG. 7 is a diagram illustrating an example of a sequence of a communication regulation instruction by a communication provider device;

FIG. 8 is a diagram illustrating an example of a sequence of a communication deregulation instruction by a communication provider device;

FIG. 11 is a diagram illustrating a registration screen of contract information between a communication provider device and a service provider device;

FIG. 12 is a diagram illustrating a confirmation screen of a service license displayed on a user device in order for a user to use a service of a service provider;

FIG. 13 is a diagram illustrating a registration screen of contract information displayed on a user device when a user uses a service based on a contract between a communication provider and a service provider;

FIG. 14 is a diagram illustrating a registration screen of affiliated service user information which is transmitted from a service provider device to a communication provider device;

FIG. 17 is a diagram illustrating a table for managing an affiliated service and a service user by a communication control device;

FIG. 18 is a diagram illustrating a table for managing server information of a service provider device by a communication control device;

FIG. 19 is a diagram illustrating a table for managing a communication specification of an affiliated service by a communication control device;

FIG. 20 is a diagram illustrating a table for managing a service user of an affiliated service by a communication control device;

FIG. 21 is a diagram illustrating session log information managed by a communication control device;

FIG. 22 is a diagram illustrating a table for managing a fee plan of an affiliated service by a communication control device;

FIG. 23 is a diagram illustrating a table for managing a fee calculation method of an affiliated service by a communication control device;

FIG. 24 is a diagram illustrating a table for managing a communication state of an affiliated service by a communication control device;

FIG. 25 is a diagram illustrating a table for managing a fee billing destination of an affiliated service by a communication control device;

FIG. 26 is a diagram illustrating a table for managing a communication specification including information for sharing a communication volume among a plurality of affiliated services by a communication control device;

FIG. 27 is a diagram illustrating a table for managing a communication state including information for sharing a communication volume among a plurality of affiliated services by a communication control device.

DETAILED DESCRIPTION OF THE EMBODIMENTS

Hereinafter, exemplary embodiments will be described with reference to the appended drawings.

First Embodiment

Figure 1:
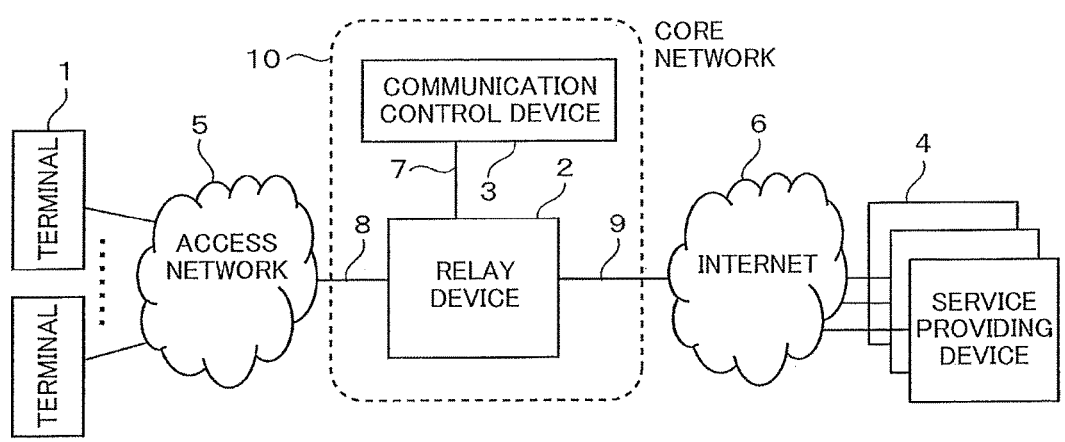
FIG. 1 is a diagram illustrating a network configuration diagram.

A configuration of a computer system according to the present embodiment includes a relay device 2 and a communication control device 3 as a communication provider device as in the configuration diagram illustrated in FIG. 1.

In the present embodiment, one or more terminals 1 are connected to the relay device 2 installed in a core network 10 via an access network 5 and a network 8. The relay device 2 is connected to the communication control device 3 via a network 7 in the core network 10. The relay device 2 is connected to a service providing device 4 serving as a service provider device via a network 9 and the Internet 6.

The relay device 2 has a basic function of relaying communication between the terminal 1 and the service providing device 4, and the communication control device 3 has a basic function of identifying communication to be relayed and performing determination based on a predetermined criterion and communication regulation based on a determination result for each identified communication. A plurality of relay devices 2 and a plurality of communication control devices 3 may be provided and may be appropriately used at the time of connection to the different service providing devices 4.

In the present embodiment, an example in which the relay device 2 and the communication control device 3 are configured with separate hardware is described, but the relay device 2 and the communication control device 3 may operate on one or more of hardware.

Figure 2:
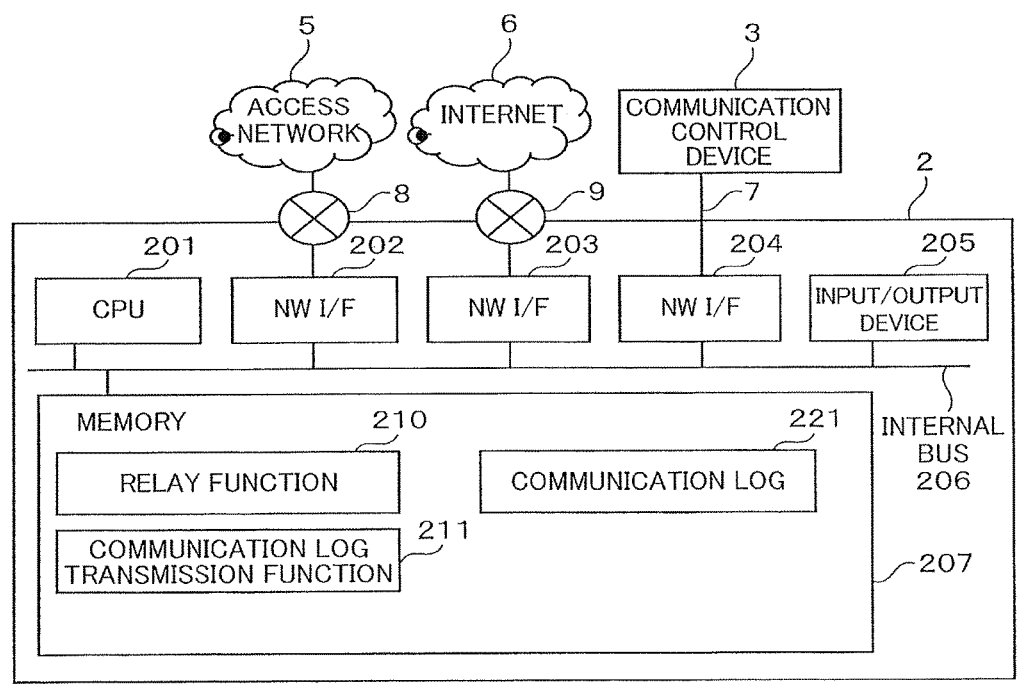
FIG. 2 is a diagram illustrating an exemplary configuration of a device that undertakes measurement and control.

FIG. 2 is a diagram illustrating an exemplary configuration of the relay device 2. The relay device 2 is implemented on a computer in which one or more CPUs 201, one or more network interfaces (NW I/Fs) 202 to 204, an input/output device 205, and a memory 207 are connected with one another via a communication path 206 such as an internal bus. The NW I/F 202 is connected with the access network 5 via the network 8. The NW I/F 203 is connected with the Internet 6 via the network 9. The NW I/F 204 is connected with the communication control device 3 via the network 7.

A relays function 210 serving as a function that relays communication from the terminal 1 connected to the access network 5 to the service providing device 4 connected to the Internet 6, a communication log 221 of the relay process, and a communication log transmission function 211 that transmits the communication log 221 to the communication control device 3 are stored in the memory 207. The communication log 221 may have a form in which it is stored in a recording medium usable by the relay device 2. The recording medium refers to a storage medium such as a hard disk device attachable to an external device interface (not illustrated) or a communication medium (a cable or a wireless means connected to the NW I/Fs 202 to 204, an optical network, or a carrier wave or a digital signal propagating through a network). The relays function 210 or the communication log transmission function 211 may be introduced into the memory 207 through a recording medium usable by the relay device 2 as necessary.

Figure 3:
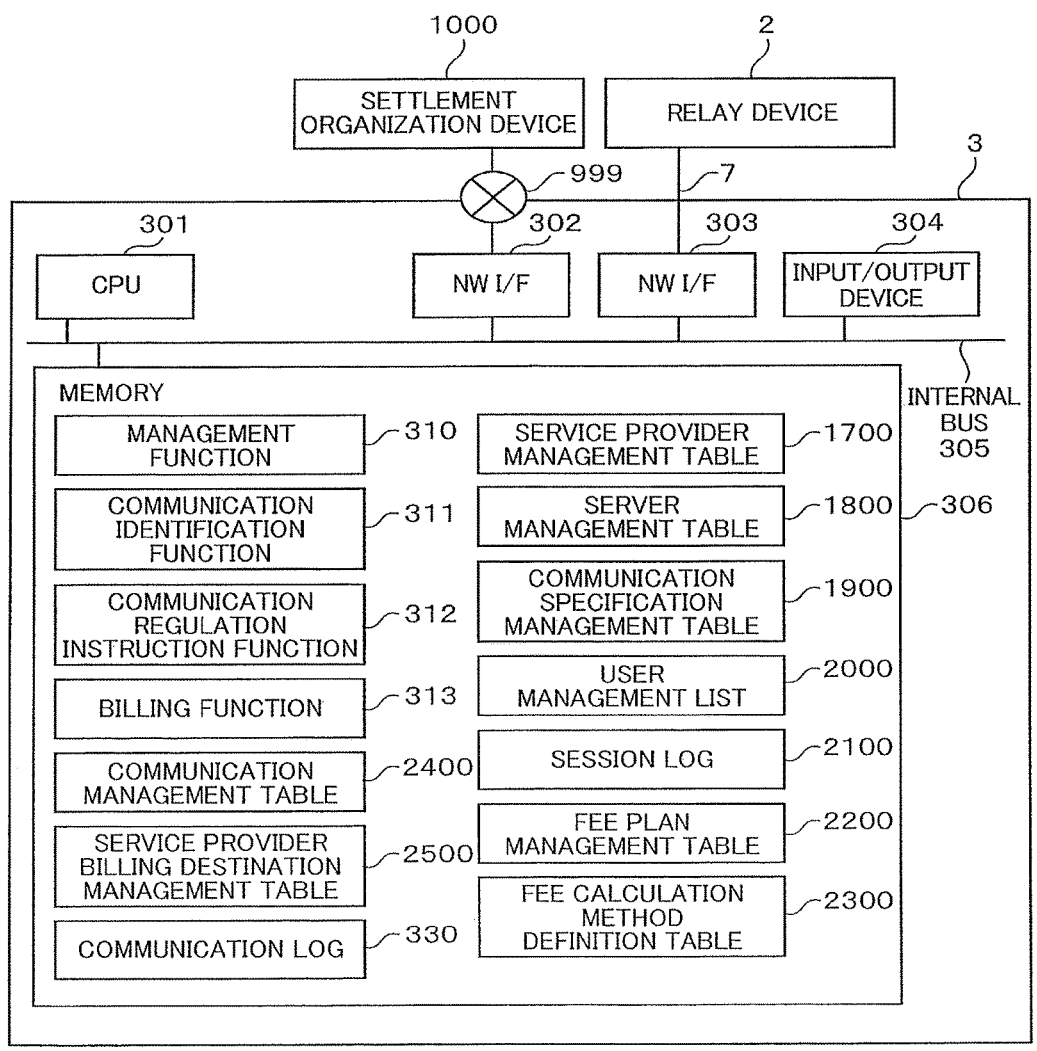
FIG. 3 is a diagram illustrating an exemplary configuration of a device that undertakes communication identification determination and communication regulation instruction.

FIG. 3 is a diagram illustrating an exemplary configuration of the communication control device 3. The communication control device 3 is implemented on a computer in which one or more CPUs 301, one or more NW I/Fs 302 and 303, an input/output device 304, and a memory 306 are connected with one another via a communication path 305 such as an internal bus. The NW I/F 302 is connected with a settlement organization device 1000 via a network 999. The NW I/F 303 is connected with the relay device 2 via the network 7.

A program of implementing a management function 310 that performs, for example, registration of various kinds of information, a communication identification function 311 that receives the communication log 221 from the relay device 2 and performs a communication identification process, a communication regulation instruction function 312 that gives a communication regulation instruction to a network device such as the relay device 2, and a billing function 313 that performs a fee calculation and a billing process based on a calculation result is stored in the memory 306.

Further, a service provider management table 1700 that stores contract information with the service provider, a server management table 1800 for managing a server providing a service by the service provider device, a communication specification management table 1900 for managing a communication specification of each service by a contract with the service provider, a user management list 2000 for managing the user using the contract with the service provider, a session log 2100 for storing and managing the communication log 221 received from the relay device 2, a fee plan management table 2200 for managing a fee plan of communication of each service, a fee calculation method definition table 2300 for defining a calculation method for performing a fee calculation of communication of each service, a communication management table 2400 for managing a communication state of each user obtained by analyzing the communication log 221, a service provider billing destination management table 2500 for managing information for billing a service provider for a communication fee, and a communication log 330, and a communication log 330 storing the session log 2100 received from the relay device 2 according to a classification of an affiliated service or a non-affiliated service are stored in the memory 306. Each of the tables may be stored in a recording medium usable by the communication control device 3. The management function 310, the communication identification function 311, the communication regulation instruction function 312, and the billing function 313 may be introduced into the memory 306 via a recording medium usable by the communication control device 3 as necessary.

Interested parties of the present embodiment include three parties, that is, the user, the service provider, and the communication provider. The service providers are classified according to the presence or absence of an affiliation with the communication provider. A service provider having an affiliation with the communication provider is referred to as an "affiliated service provider," and a service provider having no affiliation is referred to as a "non-affiliated service provider." As a characteristic configuration of the present embodiment, the affiliated service provider has an affiliation with the communication provider, and makes a contract in which the affiliated service provider pays a communication fee when the user uses a service provided by a service providing device of the affiliated service provider. The user makes a contract for using an affiliated service provided by the service providing device of the affiliated service provider with the affiliated service provider so that a communication fee is included. The user makes a line contract with the communication provider.

In a model of a tripartite contract, the user makes a contract with the affiliated service provider for the affiliated service use, pays a service use fee (including a communication fee) to the service provider, and pays a line maintenance fee (including a basic fee or the like) for performing communication to the communication provider (which may include a non-affiliated service use fee). When the affiliated service is used, the communication provider device calculates a communication fee and then bills the affiliated service provider for the calculated fee.

The user can use a service provided by the service providing device of the non-affiliated service provider through the communication provider in addition to the service provided by the service providing device of the affiliated service provider. In this case, communication between the user and the non-affiliated service provider is not associated with the three parties of the user, the communication provider, and the affiliated service provider. However, the communication fee that the user pays to the communication provider includes a communication fee occurring when the user uses the service provided by the service providing device of the non-affiliated service provider.

Figures 15, 16:
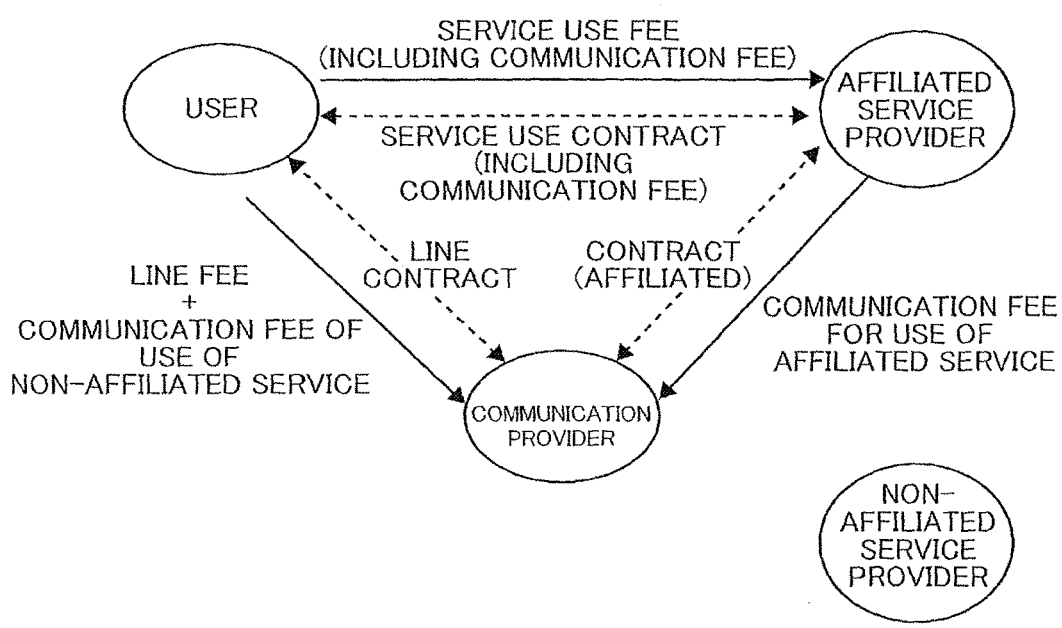
FIG. 15 is a diagram illustrating a registration screen of a communication deregulation request for an affiliated service user device which is transmitted from a service provider device to a communication provider device.
FIG. 16 is a diagram illustrating an exemplary configuration of a model in which a tripartite contract of a user, a communication provider, and a service provider and a fee payment are combined.

FIG. 16 illustrates a configuration of the above-mentioned model.

The communication control device 3 identifies communication of each user device in units of services using information illustrated in FIGS. 17 to 21. Based on a service use contract between the user and the service provider illustrated in FIG. 17, 18, or 20, the communication control device 3 identifies an affiliated service based on a session log of FIG. 21 received from the user terminal 1 that has made the use contract, and performs communication control by applying a provision level of each service illustrated in FIG. 19 to the identified affiliated service. The respective drawings will be described below.

Information illustrated in FIGS. 17 to 21 and information illustrated in FIGS. 22 to 25 are referred to collectively as "service management information."

FIG. 17 illustrates an example of the service provider management table 1700. The service provider management table 1700 includes a service (referred to as an "affiliated service") provided based on a contract by the service providing device operated by the service provider and a list identifier of a registered user list for managing the users of the affiliated services. An identifier identifying the service provider is registered in a service provider ID field 1701. An identifier identifying a service provided by the service provider device is registered in a service ID field 1702. A list name of a user list for centrally managing the users using the affiliated service is registered in a registered user list field 1703.

FIG. 18 illustrates an example of the server management table 1800 for managing information based on the contract between the communication provider and the service provider, that is, server information of the service providing device operated by the service provider 4. Information of the server of the service providing device 4 that is operated by the service provider and provides a service used by the user is registered in the server management table 1800. An identifier identifying the service provider is registered in a service provider ID field 1801. An identifier identifying the service is registered in a service ID field 1802. An IP address of the server of the service providing device 4 used for service provision by the service provider is registered in a server IP field 1803. Here, since there are cases in which the service provider provides the service using a plurality of service providing devices 4, there are cases in which a plurality of records are registered in each service ID field 1802 of the server management table 1800.

FIG. 19 illustrates an example of the communication specification management table 1900 for managing a communication specification of each service, a regulation value of communication, and the like as information based on the contract between the communication provider and the service provider.

An identifier identifying a line specification uniquely is registered in a line specification ID field 1901. A service identifier of the service is registered in a service ID field 1902. Line type information identifying a communication line type of the service is registered in a line type field 1903. Information of a bandwidth of communication available for the service is registered in a communication bandwidth field 1904. An upper limit value of a communication volume of communication available for the service is registered in a communication volume (restriction value) field 1905. However, when there is not restriction to a communication volume in a contract for the service, no information may be registered. An identifier identifying a record of the fee plan management table 2200 uniquely is registered in a fee plan ID field 1906. When a communication regulation is performed due to the use of the service, a setting value of a communication bandwidth is registered in a restricted bandwidth field 1907. Depending on the contract between the communication provider and the service provider, there may be a service provision form in which a restriction written in the communication volume field 1905 or the restricted bandwidth field 1907 of FIG. 19 is not set. In this case, the fields are blank.

FIG. 20 illustrates an example of the user management list 2000 for centrally managing a list of the users who can use the service as information based on the contract between the communication provider and the service provider.

An identifier identifying a service is registered in a service ID field 2001, similarly to the service ID field 1802 of FIG. 18. A list name for managing the user who can use the service is registered in a registered user list field 2002, similarly to the registered user list field 1703 of FIG. 17. A user identifier of the user who can use the service is registered in a user ID field 2003.

FIG. 21 illustrates an example of the session log 2100 that is the communication log 221 when the user performs communication using the terminal 1 and output from the relay device 2 as a session management log. An identifier for managing a session serving as a unit from a communication start to a communication end in one communication of the user terminal 1 is registered in a session ID field 2101. A user identifier of the session is registered in a user ID field 2102.

It is more desirable to register the user identifier (for example, a telephone number) in the user ID field 2102 than the user device ID. Using the user identifier, the communication provider and the service provider can recognize a service (a service in which the service provider pays a communication fee) provided to the user in terms of an affiliation. In the contract between the user and the service provider, there is a possibility that the user will apply for a contract using another device, and thus it may be hard to identify the user using the user device ID. In order to identify the user, the service provider receives the user identifier (for example, the telephone number) and identifies the user at the time of a contact, and the service provider transfers the user identifier to the communication provider. The communication provider device identifies communication using the identifier.

An IP address allocated to the terminal 1 of the user that has performed communication of the session is registered in a terminal IP field 2103. A communication destination (an IP address of the service providing device 4) of communication of the session is registered in a destination IP field 2104. A total amount of communication occurred in the session is registered in a communication volume field 2105. A communication time of the session is registered in a communication time field 2106.

FIG. 22 illustrates an example of the fee plan management table 2200 for managing a fee plan applied to communication of the service provided by the service provider as information based on the contract between the communication provider and the service provider. An identifier identifying the fee plan management table 2200 uniquely is registered in a fee plan ID field. A name of a fee plan of the service is registered in a fee plan name field 2201. The fee plan management table 2200 may include a fee plan based on the line contract between the communication provider and the user.

FIG. 23 illustrates an example of the fee calculation method definition table 2300 for defining a fee calculation of a communication fee paid by the service provider as information based on the contract between the communication provider and the service provider. A name of a fee plan of the service is registered in a fee plan name field 2301. A communication fee calculation method of the fee plan is registered in a calculation method field 2302. As described above with reference to FIG. 22, the fee calculation method definition table 2300 may include a fee plan based on the line contract between the communication provider and the user.

FIG. 24 illustrates an example of the communication management table 2400 for managing a state of communication related to the service based on the contract between the communication provider and the service provider. A service identifier of the service is registered in a service ID field 2401. An identifier of the user who uses the service is registered in a user ID field 2402. A fee plan identifier of the service is registered in a fee plan ID field 2403. Information of a communication bandwidth in current communication is registered in a communication bandwidth field 2404. A total communication volume when the service is used by the user terminal 1 is registered in a total communication volume field 2405. It is possible to recognize a current communication state for each service provided to the user terminal 1 with reference to the communication management table 2400.

FIG. 25 illustrates an example of the service provider billing destination management table 2500 used when the communication provider bills the service provider for the communication fee as information based on the contract between the communication provider and the service provider. An identifier identifying the service provider is registered in a service provider ID field 2501. A service provider name is registered in a service provider name field 2502. Billing destination information when a bill is sent to the service provider is registered in a billing destination information field 2503.

Figure 4:
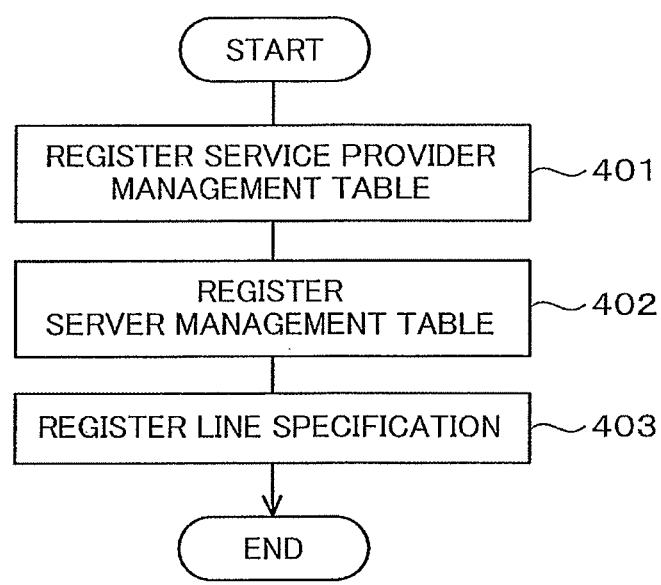
FIG. 4 is a diagram illustrating an example of a rough process flow of a prior contract between a communication provider and a service provider.

FIG. 4 illustrates an example of a process flow when the communication provider and the service provider make a contract before service provision. As illustrated in FIG. 16, a contract including a communication control, a payment system, and the like is made between the communication provider and the service provider in units of services in advance. In a flowchart illustrated in FIG. 4, when the contract is made, the service provider registers a communication specification, information of the service provider (the identifier of the service providing device operated by the service provider), and the like in the communication provider.

The management function 310 of the communication control device 3 randomly generates the service identifier of each service obtained at the time of the contract and identifiers identifying the service provider and the service uniquely, and registers the generated information in the service provider management table 1700 (step 401). Then, the management function 310 registers the IP address of the server of the service providing device 4 in the server management table 1800 based on the information similarly obtained at the time of the contact (step 402). Then, the management function 310 registers the line specification information of each service in the communication specification management table 1900 based on the information obtained at the time of the contact (step 403). Here, an example of a screen registered at the time of the contract is illustrated in FIG. 11. As illustrated in FIG. 11, the service provider sets a service name, a service ID, a server IP, and various kinds of line specifications at the time of a contract. In this flowchart, respective steps are performed based on the input information.

Figure 5:
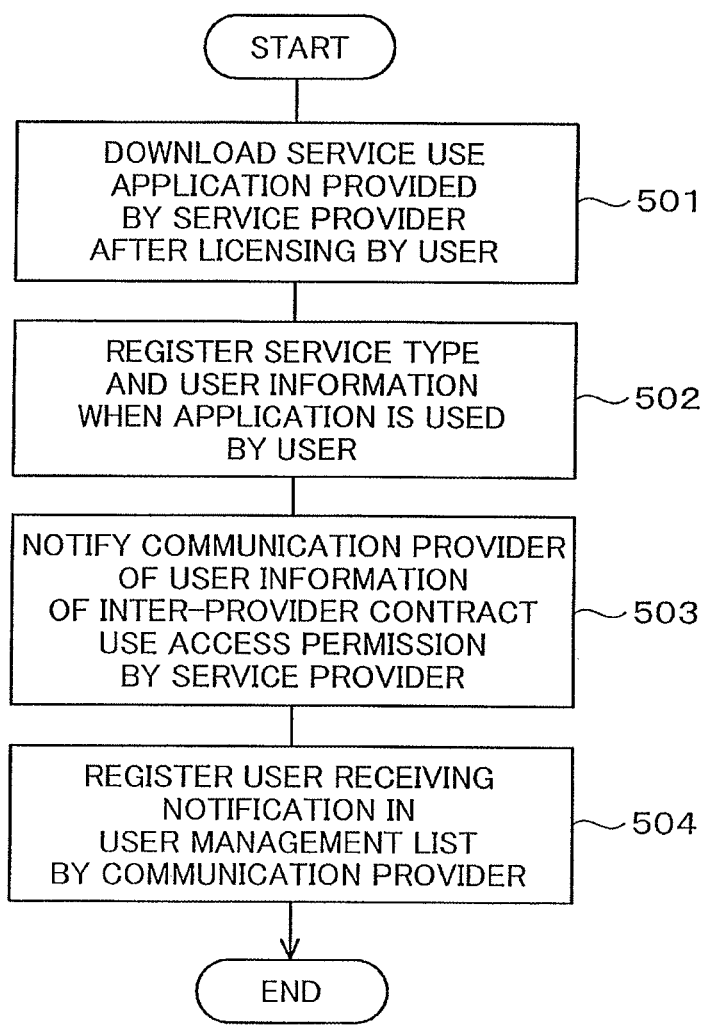
FIG. 5 is a diagram illustrating an example of a sequence in which a user device downloads an application from a service provider device and makes a contract in order to use a service using a contract between a communication provider and a service provider.

FIG. 5 illustrates an example of a process flow at the time of a contract when the service provider provides the user with the service. After the contract between the communication provider and the service provider illustrated in the flowchart of FIG. 4, the service provider sells a communication service included in the contract with the communication provider to the user. FIG. 5 is a process flow when downloading of an application program (referred to as an "application") used to use the service, information registration for starting the service use, and applying for an access permit of a registered user to the service providing device operated by the service provider device are performed between the user device and the service providing device operated by the service provider.

In order to perform this process flow, the terminal 1, the service provider device (not illustrated) (the service providing device 4 may be used), and the communication provider device (not illustrated) (the communication control device 3 may be used) are assumed to be in a communication enable state.

First, the user device downloads an application to the terminal 1 in order to use the service provided by the service providing device operated by the service provider. At this time, the service providing device requests the user to get a license (step 501). Here, FIG. 12 illustrates an example of a license suggestion screen. For example, the license corresponds to terms and conditions (an agreement) indicating that the service provider providing the application bears a communication fee in units of services. However, this step is not essential. The license may be obtained by any other method.

In the terms and conditions, the agreement indicating that, when the user uses the application, a communication fee for an application use is borne by not the user but the service provider is included. When the user downloads the application, the service provider suggests the agreement to the user as the terms and conditions through the providing device, and when the user gives an approval for the suggestion, the application is downloaded.

After the license is made, the user selects a service type of a service to contract (use) when the application is used and registers the user information in the terminal 1 (step 502). FIG. 13 illustrates an example of the registration screen of step 502. In the present embodiment, the telephone number is described as the user information.

Then, the service providing device transmits the user information such as the user identifier obtained in step 502 and the service identifier to the communication control device (step 503). FIG. 14 illustrates an example of a transmission screen. FIG. 14 illustrates an example in which a plurality of user IDs are registered, but a plurality of users may be registered at a time, and it is desirable to register one or more user identifiers.

Then, in step 503, the communication control device searches the service provider management table 1700 using the received service identifier as a key, and acquires the list name registered in the registered user list field 1703. Then, after checking the presence or absence of the user previously registered in the user management list 2000, the list name and the service ID are registered (step 504). After step 504 is performed, at the communication provider, when the user uses the service, the communication process based on the contract between the communication provider and the service provider is performed.

When the user uses the service, the relays function 210 of the relay device 2 relays communication from the user terminal 1 to the service providing device 4. Here, when the relay process is performed, the communication log 221 (the session log) is output, and the communication log 221 is transmitted to the communication control device 3 via the network V. The management function 310 of the communication control device 3 manages the communication log 221 received from the relay device 2 as the session log 2100.

Figure 6:
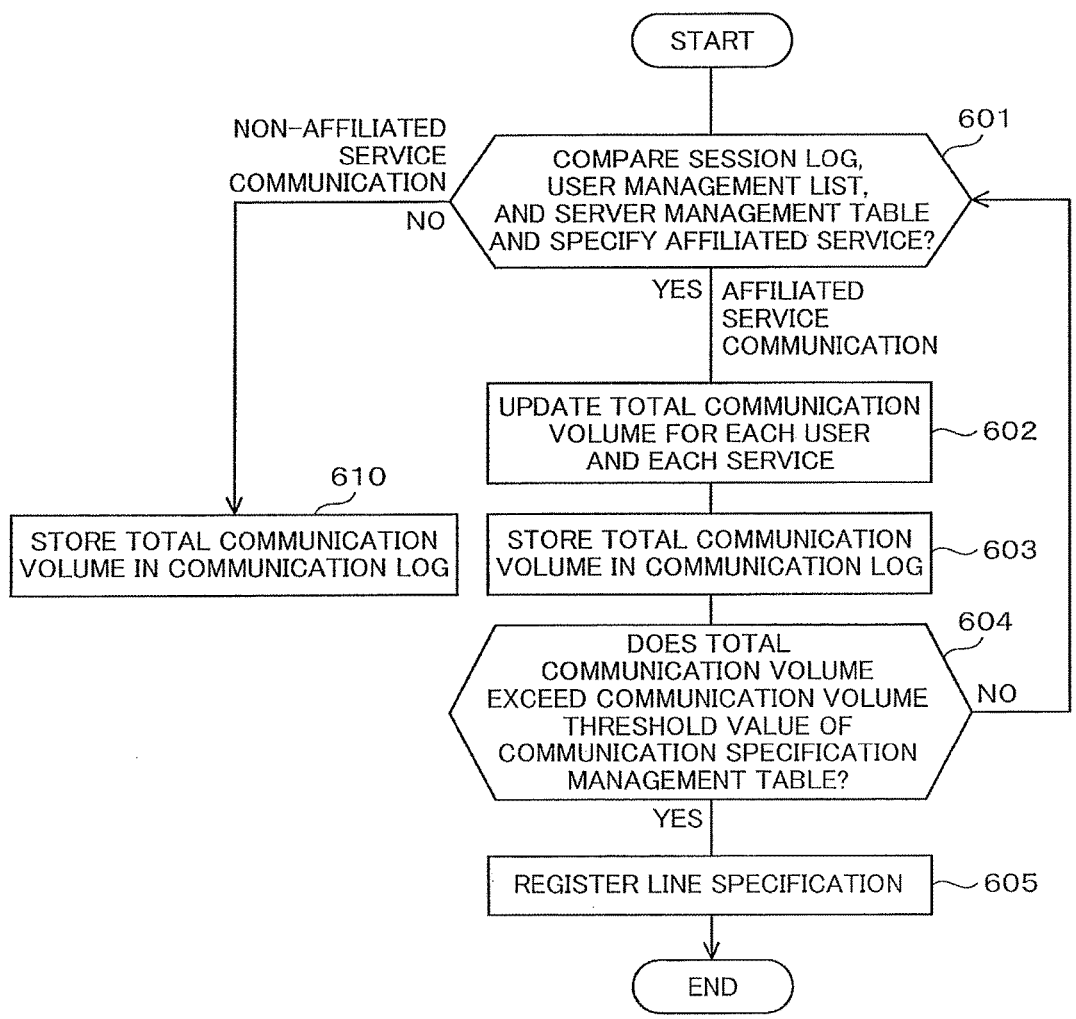
FIG. 6 is a diagram illustrating an example of a sequence of a communication regulation instruction based on communication identification of an affiliated service and a non-affiliated service by a communication provider device.

FIG. 6 illustrates an example of a process flowchart when the communication identification function 311 of the communication control device 3 identifies communication related to the affiliated service and communication related to the non-affiliated service.

First, the communication identification function 311 collates the session log 2100, the user management list 2000, and the server management table 1800, and determines whether or not it is possible to specify the affiliated service provided to the user terminal 1 (it is possible to specify the registered user list) based on the information registered in the user ID field 2102 and the destination IP field 2104 of the session log 2100.

Specifically, the service ID 1802 is specified based on the destination IP 2104 and the server management table 1800, and it is determined whether or not it is registered as the affiliated service based on the specified service ID 1802 and the service ID 2001 and the registered user list 2002 of the user management list 2000. When a negative result is obtained (when it is not registered in the registered user list as a result of the collation, it is determined to be non-affiliated service communication, whereas when a positive result is obtained (it is possible to specify the registered user list in which the registration is completed), it is determined to be affiliated service communication (step 601).

When the affiliated service communication is specified in step 601, the process proceeds to step 602, and the communication identification function 311 overwrites and registers a value obtained by adding the communication volume registered in the communication volume field 2105 of the session log 2100 to the registration value of the total communication volume field 2405 corresponding to the user of the service in the communication management table 2400 (step 602). Here, when no registration is performed on the service of the communication management table 2400, the communication identification function 311 registers a line related to the service in the communication management table 2400 from the service provider management table 1700, the server management table 1800, and the communication specification management table 1900, and then performs a process on the total communication volume field 2405 of the communication management table 2400.

Then, after the total communication volume is updated, the communication identification function 311 stores the updated total communication volume in the communication log 330 as the communication log for the affiliated service (step 603).

After storing the updated total communication volume in the communication log 330, the communication identification function 311 determines whether or not the total communication volume exceeds (equal to or more than) a threshold value registered in the communication volume field 1905 corresponding to the service in the communication specification management table 1900. When the total communication volume exceeds the threshold value, the process proceeds to step 605 in order to perform the communication regulation, but when the total communication volume is equal to or less than the threshold value, the communication regulation is not performed, and the process returns to step 601 (step 604).

Then, in step 604, when the total communication volume is determined to exceed the threshold value, the communication regulation is performed. The communication regulation instruction function 312 of the communication control device 3 performs a flowchart of a communication regulation instruction illustrated in FIG. 3 (step 605).

When it is hard to specify the service in step 601 (that is, when it is the non-affiliated service communication), the process proceeds to step 610, the communication identification function 311 stores it in the communication log 330 as the communication log for the non-affiliated service (step 610).

Figure 9:
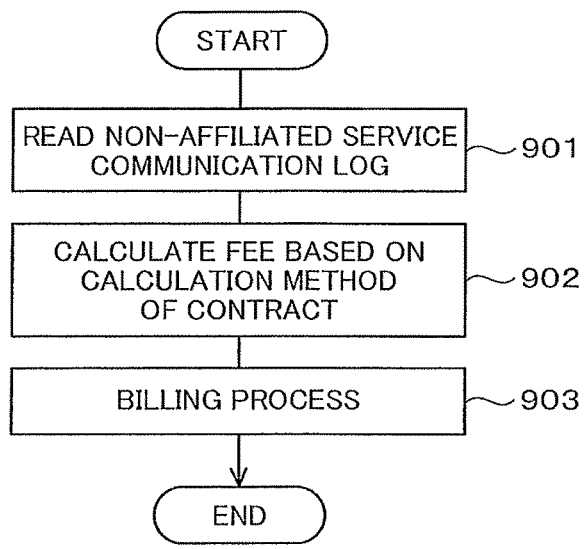
FIG. 9 is a diagram illustrating an example of a sequence of a fee calculation/billing process using a communication log for non-affiliated service communication by a communication provider device.
Figure 10:
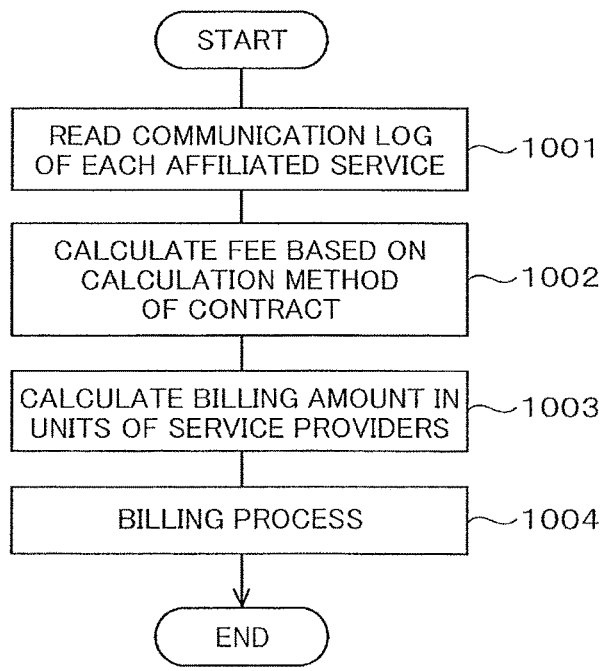
FIG. 10 is a diagram illustrating an example of a sequence of a fee calculation/billing process using a communication log for affiliated service communication by a communication provider device.

By affiliating the user information and the server information of the service providing device 4 which are the information based on the contract between the communication provider and the service provider and the session log 2100 by performing the flowchart illustrated in FIG. 6, it is possible to identify the affiliated service or the non-affiliated service based on the session log 2100. By performing the identifying, it is possible to bill each of the user and the service provider for a fee after fee calculations illustrated in FIG. 9 and FIG. 10 are performed.

FIG. 7 illustrates an example of a process flow when the communication control device 3 gives a communication regulation instruction to the relay device so that the communication band is suppressed to the value registered in the restricted bandwidth field 1907 when the communication volume of the communication of the service provided to the user terminal exceeds the value registered in the communication volume field 1905 of the communication specification management table 1900. The communication identification function 311 overwrites the value of the communication bandwidth field 2404 of the service in the communication management table 2400 with the value registered in the restricted bandwidth field 1907 of the service in the communication specification management table 1900 (step 701). Then, the communication identification function 311 transmits a change instruction to change the current communication bandwidth to the relay device 2 using the value of the communication bandwidth field 2404 set in step 701 (step 702). In the present embodiment, a process at the relay device 2 side that receives the change instruction is omitted.

FIG. 8 illustrates an example of a process flow when the deregulation is performed on the communication regulation instruction illustrated in FIG. 7. In the present embodiment, illustrated is a flowchart of a process performed by the communication control device when, in order to perform the deregulation, the user transmits a deregulation request to the service provider (there are cases in which a fee payment is included), and the service providing device transmits the deregulation request to the communication control device in response to the request. FIG. 15 illustrates an example of an information registration screen when the service providing device transmits the deregulation request to the communication control device. Unlike the present embodiment, the user device may transmit the request directly to the communication control device.

The communication identification function 311 of FIG. 8 updates the value of the communication bandwidth field 2404 of the service in the communication management table 2400 to a deregulated bandwidth according to the request of the service providing device as illustrated in FIG. 15 (step 801). For example, the value of the communication bandwidth field 2404 of the service in the communication management table 2400 is updated to a value of a band setting portion of FIG. 15. Then, the communication identification function 311 transmits a change instruction to change the current communication bandwidth to the relay device 2 using the value of the communication bandwidth field 2404 set in step 801 (step 802).

FIG. 9 illustrates an example of a process flow when a fee calculation is performed based on the communication log of the non-affiliated service. The billing function 313 of the communication control device 3 reads the communication log for the non-affiliated service of the communication log 330 (step 901). Then, the billing function 313 performs a fee calculation according to a fee calculation method (for example, the calculation method based on the fee plan of the table illustrated in FIG. 22 or FIG. 23) based on the line contract between the user and the communication provider (step 902).

The billing function 313 performs the billing process for the user or the user terminal 1 based on the execution result of step 902 (step 903). In the present embodiment, the description proceeds with the process of the affiliated service, and thus the fee calculation and the billing process for the communication fee related to the non-affiliated service will not be described in detail. In the present embodiment, the communication log 330 is classified into the log for the affiliated service and the log for the non-affiliated service and stored.

FIG. 10 illustrates an example of a process flow when a fee calculation is performed based on the communication log for the affiliated service.

The billing function 313 of the communication control device 3 reads the communication log for the affiliated service of the communication log 330 (step 1001). Then, the billing function 313 reads the calculation method defined in the calculation method field 2302 identical to the fee plan name field 2301 of the fee calculation method definition table 2300 with reference to the communication specification management table 1900 and the fee plan management table 2200 based on the service identifier in the communication log 330, and performs the fee calculation based on the calculation method and the total communication volume included in the communication log (step 1002). Then, the billing function 313 collects the calculation results in units of service providers (step 1003). Then, the billing function 313 performs the billing process for the service provider based on billing information of the billing destination information field 2503 associated with the service provider registered in the service provider billing destination management table 2500 (step 1004). In the present embodiment, a detailed description of the billing process and the fee calculation is omitted. Further, when the calculation results are collected in units of service providers as described above in step 1003, there may be cases in which the fee calculation results (specifications) in units of users are required according to the contract between the service provider and the communication provider.

In the present embodiment, when the user is determined to use the communication fee-included service provided by the service providing device based on the contract (affiliation) between the communication provider and the service provider, the communication control device may combine information (the user identification information) and the communication logs of the affiliated communication using the contract and the non-affiliated communication based on the contract so that they can be identified and bill the user having the identification or the service provider for the communication fee. In the present embodiment, the example in which the telephone number is used as the user identifier for identifying the communication is described, alternatively another system may be provided. The another system may newly defines an arbitrary identifier identifying the user uniquely between the communication provider device and the service provider device, includes the identifier, for example, in header information of a URL or a communication protocol (HTTP or TCP) included during communication, and enables the communication control device to identify communication.

In the present embodiment, when the user uses the affiliated service, the application distributed (sold) by the service providing device is used, but a method using no application may be used.

In the present embodiment, as described above, the communication provider can set the communication fee to each of the user and the service provider according to the content of the contract between the communication provider and the service provider. For example, when the communication fee is paid in units of packets, it is possible to set the higher communication fee in units of packets when the service provider makes a payment than when the user makes a payment. The service provider does not give a communication fee burden to the user compared to the service providers in the same industry and thus can improve an added value of the service and be differentiated from the service providers in the same industry. The user can use the method described in the present embodiment without a new contract with the communication provider if a predetermined amount of service use fee is paid and expect that a new communication demand can be stimulated.

In addition, a form in which a service is provided in view of a communication priority or a security level in addition to communication band control while using the system described in the present embodiment is also considered.

Second Embodiment

In the first embodiment, an example in which, when a predetermined total communication volume is exceeded, the communication regulation is performed, and the communication band is narrowed according to the contract between the communication provider and the service provider has been described. The present embodiment will be described in connection with an example in which a plurality of service providers can use a predetermined communication volume before the communication regulation is performed according to the contract with the communication provider. The present embodiment will be described focusing on different points from the first embodiment.

FIG. 26 illustrates an exemplary table configuration in which a sharable volume filed 1907 is added to the communication specification management table 1900 illustrated in FIG. 19. A communication volume that is decided when the contract is made between the communication provider and the service provider and can be shared with the service providing devices operated by the other service providers in the communication volume (the restriction value) before the communication regulation provided to the user device in the present contract is registered in the sharable volume filed 1907. The registration is performed in step 403 of the flowchart for the contract between the communication provider and the service provider illustrated in FIG. 4.

FIG. 27 illustrates an exemplary table configuration in which a sharable volume filed 2406 is added to the communication management table 2400 illustrated in FIG. 24. A communication volume that can be shared between services in communication of each service provided to the user terminal 1 is registered in the sharable volume filed 2406 of this table. When the communication starts, in step 602, the communication identification function 311 initially registers the registration value of the sharable volume filed 1907 of the communication specification management table 1900 in the sharable volume filed 2406 of the communication management table 2400.

In the present embodiment, the service management information described in the first embodiment is assumed to include the tables illustrated in FIGS. 26 and 27.

When the communication volume is determined to exceed the threshold value in step 604 of FIG. 6, the communication identification function 311 checks whether or not any other service different from the corresponding service is provided to the user terminal 1 of the communication management table 2400. When any other service different from the corresponding service is determined to be provided to the user terminal 1, if the registration value of the sharable volume filed 2406 of the other service in the communication management table 2400 is not zero, and the registration value of the total communication volume field 2405 does not reach the registration value of the communication volume field 1905 of the other service in the communication specification management table 1900, the difference between the registration value of the communication volume field 1905 of the other service and the registration value of the total communication volume field 2405 is set as a new communication volume, and the service (the service in which the communication volume exceeds the threshold value) is continuously counted. For example, when the difference is 500 MB, it is determined whether or not the communication volume exceeds the threshold value based on the value obtained by adding 500 MB to the communication volume of the service. On the other hand, a value obtained by subtracting the difference (500 MB in the above example) from the communication volume of the other service is set as the total communication volume, and it is determined whether or not the communication volume exceeds the threshold value.

According to the present embodiment, in addition to the technique described in the first embodiment, the sharable communication volume is provided to or from the service providing devices operated by the other service providers according to the contract between the communication provider and the service provider, and when the user makes the service use contract with a plurality of service providers, even if the communication volume of the service provided by the service providing device operated by a certain service provider exceeds a predetermined threshold value, the service can be continuously provided using the communication volume of the other service without performing the communication regulation.

Further, in the present embodiment, since the service providing devices operated by a plurality of service providers can share the communication volume as described above, a communication unit price may differ according to the service provider. A sharable communication volume may be calculated in view of a percentage thereof.

The system described in the present embodiment follows the system in which the communication provider bills the service provider for the communication fee based on the communication volume of the user device as described above in the first embodiment. In the present embodiment, as described above, when the communication volume is shared among the service providing devices operated by a plurality of service providers, the communication fee is variously considered. For example, the communication provider may additionally bill the service provider serving as the sharing destination of the communication volume for the communication fee for the shared amount and refund the communication fee for the shared amount to the service provider serving as the sharing source of the communication volume.

Third Embodiment

The present embodiment will be described in connection with an example in which a mobile virtual network operator (hereinafter, an "MVNO") is included in the network configuration described in the first embodiment.

The MVNO refers to a service provider that does not have its own physical mobile line network such as a mobile telephone or a PHS but rents (is allocated) a line network from a service provider (a mobile network operator (MNO) having a line network and provides a communication service in its own brand.

Figure 28:
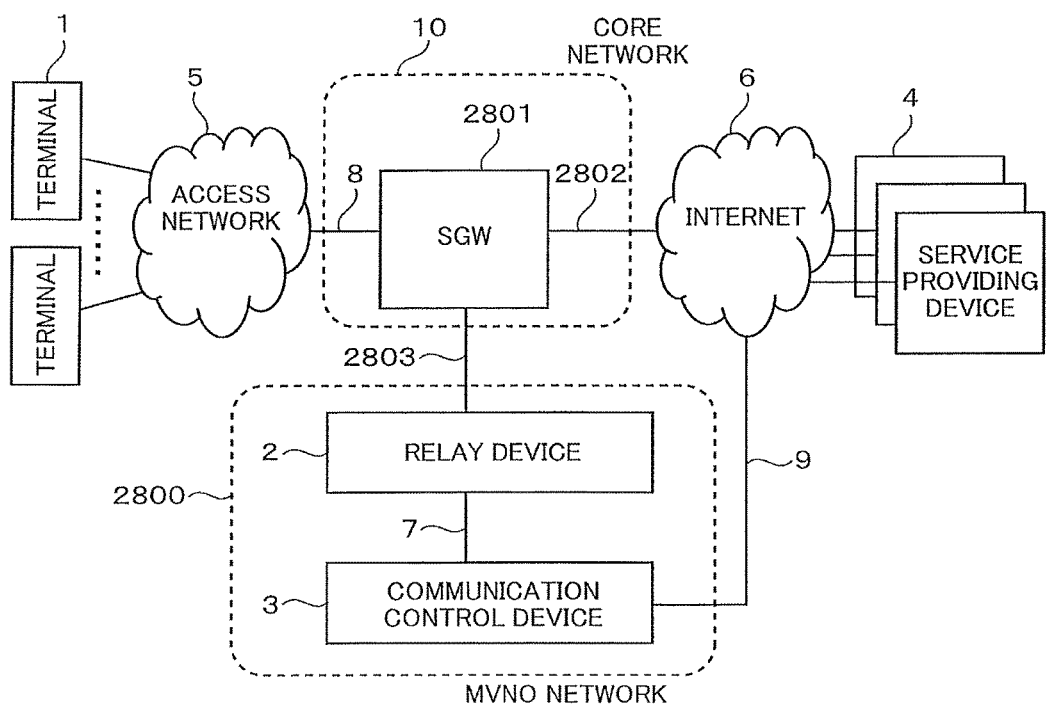
FIG. 28 is a diagram illustrating a network configuration diagram including a virtual communication provider.

FIG. 28 illustrates an example of a network configuration including a communication control device operated by the MVNO in addition to the configuration illustrated in FIG. 1. The following description will proceed with different portions from FIG. 1. In the system configuration illustrated in FIG. 1, the relay device 2 and the communication control device 3 are included in the core network 10. When the devices are operated by the MVNO, communication between the terminal 1 and the service providing device 4 is performed via a network 2803 at an MVNO network 2800 side other than a network 2802 at the Internet 6 side through a serving gateway (SGW) 2801 in the core network 10.

The SGW 2801 has substantially the same hardware as the relay device 2. Operations of the relay device 2 and the communication control device 3 arranged in the MVNO network 2800 are performed in the same manner as in the first embodiment.

A configuration illustrated in FIG. 28 is a form (a layer 2 connection) of a connection between the MVNO device and the communication provider device. In the layer 2 connection form, the system described in the present embodiment can be implemented by the MVNO.

On the other hand, in another common connection form (a layer 3 connection), for example, although the terminal 1 includes information in a header or the like in an IP layer, when a device of such as a SGW of the communication provider relays a message, header information or the like is lost due to a process of correcting an IP packet or the like, and thus there is a restriction in that the MVNO hardly obtains information. For this reason, it is hard to perform the service identification using the IP address of the user terminal. However, using a series of methods described above, the user terminal is recognized using the user ID, and thus the service identification can be performed even in the MVNO of the layer 3 connection.

Although the present disclosure has been described with reference to exemplary embodiments, those skilled in the art will recognize that various changes and modifications may be made in form and detail without departing from the spirit and scope of the claimed subject matter.

We claim:

1. A network communication system that relays communication, comprising:
    a terminal that is used by a user:
    a relay device communicatively coupled to the terminal: and a communication control device, wherein the communication control device includes:
    a memory that stores service management information that includes an identifier of a plurality of affiliated services and a restriction value of a communication volume allowed to be linked with a particular affiliated service from the plurality of services,
    a network interface communicatively coupled to the relay device, a processor communicatively coupled to the network interface and the memory:
    wherein the processor of the communication control device; receives, using the network interface, a session log from the relay device,
    retrieves, from the memory, service management information related to the communication for implementing a service to be relayed, identifies a user identifier for the user of the terminal, determines an address of a service provider that provides the service based on the session log,
    identifies a service identifier for the service provided by the service provider,
    retrieves, from the memory, of a registered user list, wherein the registered user list indicates whether particular users that makes made a contract in which particular services are provided as affiliated services,
    links an affiliated identifier of the particular affiliated service and a particular restriction value of a particular communication volume allowed for the particular affiliated service,
    determines the communication volume of each affiliated service provided to the user of the terminal from the session fog, and
    on a condition that a total communication volume of the communication volume of any one of the plurality of affiliated services exceeds the restriction value allowed to the particular affiliated service and there is another affiliated service in which a total value of the communication volume does not exceed the restriction value, sets a value obtained by adding a difference between the total value of the another affiliated service and the restriction value to the restriction value of the particular affiliated service in which the restriction value is exceeded as a new restriction value.

2. The network system according to claim 1, wherein the service management information includes:
    a server management table that includes service identifiers of the affiliated services or non-affiliated services provided by the service provider, and the address of the service providing device that provides the affiliated services or the non-affiliated services are associated, and
    a user management list that includes the service identifier, the identifier of the registered user list, and the user identifier are associated and managed.

3. The network system according to claim 1,
    wherein the processor of the communication control device further:
    acquires the communication volume of each affiliated service provided to the user of the terminal from the session log received from the relay device, and
    instructs the relay device to perform communication regulation for the affiliated service provided to the user when the total communication volume of the communication volume of any one of the affiliated services provided to the user exceeds the restriction value allowed to the affiliated service.

4. The network system according to claim 1,
    wherein the processor of the communication control device further:
    calculates a service fee of the affiliated service for the user in units of service providers managing the service providing device that provides the affiliated service.

5. The network system according to claim 4,
    wherein the processor of the communication control device further:
    acquires a communication log for non-affiliated services provided to the user of the terminal from the session log received from the relay device,
    calculates a fee for the non-affiliated service supplied to the user indicated by the user identifier based on a fee calculation method related to the non-affiliated service and the communication log of the non-affiliated service.

6. The network system according to claim 4,
    wherein the processor of the communication control device further:
    performs a billing process including a service fee for non-affiliated service for the user in units of user identifiers.

7. The network system according to claim 4,
    the processor of the communication control device further calculates a service fee for the user for each service provider based on a fee calculation method related to the affiliated service and the total communication volume.

8. The network system according to claim 6,
wherein the communication control device further performs a process of billing the service provider for the service fee calculated.

9. The network system according to claim 3, wherein the service management information includes:
a server management table that includes service identifiers of the affiliated services or non-affiliated services provided by the service provider, and the address of the service providing device that provides the affiliated services or the non-affiliated services are associated, and
a user management list that includes the service identifier, the identifier of the registered user list, and the user identifier are associated and managed.

10. The network system according to claim 4, wherein the service management information includes:
a server management table that includes service identifiers of the affiliated services or non-affiliated services provided by the service provider, and the address of the service providing device that provides the affiliated services or the non-affiliated services are associated, and
a user management list that includes the service identifier, the identifier of the registered user list, and the user identifier are associated and managed.

11. The network system according to claim 5, wherein the service management information includes:
a server management table that includes service identifiers of the affiliated services or non-affiliated services provided by the service provider, and the address of the service providing device that provides the affiliated services or the non-affiliated services are associated, and
a user management list that includes the service identifier, the identifier of the registered user list, and the user identifier are associated and managed.

12. The network system according to claim 6, wherein the service management information includes:
a server management table that includes service identifiers of the affiliated services or non-affiliated services provided by the service provider, and the address of the service providing device that provides the affiliated services or the non-affiliated services are associated, and
a user management list that includes the service identifier, the identifier of the registered user list, and the user identifier are associated and managed.

13. The network system according to claim 7, wherein the service management information includes:
a server management table that includes service identifiers of the affiliated services or non-affiliated services provided by the service provider, and the address of the service providing device that provides the affiliated services or the non-affiliated services are associated, and
a user management list that includes the service identifier, the identifier of the registered user list, and the user identifier are associated and managed.

14. The network system according to claim 8, wherein the service management information includes:
a server management table that includes service identifiers of the affiliated services or non-affiliated services provided by the service provider, and the address of the service providing device that provides the affiliated services or the non-affiliated services are associated, and
a user management list that includes the service identifier, the identifier of the registered user list, and the user identifier are associated and managed.

15. The network system according to claim 6, wherein the processor of the communication control device further:
acquires a communication log for non-affiliated services provided to the user of the terminal from the session log received from the relay device,
calculates a fee for the non-affiliated service supplied to the user indicated by the user identifier based on a fee calculation method related to the non-affiliated service and the communication log of the non-affiliated service.

16. The network system according to claim 7, wherein the processor of the communication control device further:
acquires a communication log for non-affiliated services provided to the user of the terminal from the session log received from the relay device,
calculates a fee for the non-affiliated service supplied to the user indicated by the user identifier based on a fee calculation method related to the non-affiliated service and the communication log of the non-affiliated service.

17. The network system according to claim 8, wherein the processor of the communication control device further:
acquires a communication log for non-affiliated services provided to the user of the terminal from the session log received from the relay device,
calculates a fee for the non-affiliated service supplied to the user indicated by the user identifier based on a fee calculation method related to the non-affiliated service and the communication log of the non-affiliated service.

18. The network system according to claim 12, wherein the processor of the communication control device further:
acquires a communication log for non-affiliated services provided to the user of the terminal from the session log received from the relay device,
calculates a fee for the non-affiliated service supplied to the user indicated by the user identifier based on a fee calculation method related to the non-affiliated service and the communication log of the non-affiliated service.

19. The network system according to claim 13, wherein the processor of the communication control device further:
acquires a communication log for non-affiliated services provided to the user of the terminal from the session log received from the relay device,
calculates a fee for the non-affiliated service supplied to the user indicated by the user identifier based on a fee calculation method related to the non-affiliated service and the communication log of the non-affiliated service.

20. The network system according to claim 14, wherein the processor of the communication control device further:
acquires a communication log for non-affiliated services provided to the user of the terminal from the session log received from the relay device,
calculates a fee for the non-affiliated service supplied to the user indicated by the user identifier based on a fee calculation method related to the non-affiliated service and the communication log of the non-affiliated service.

* * * * *